US006404432B1

(12) United States Patent
Simpson

(10) Patent No.: US 6,404,432 B1
(45) Date of Patent: Jun. 11, 2002

(54) METHOD AND SOFTWARE FOR PRODUCING ENHANCED CONTOUR DISPLAY

(75) Inventor: Anne L. Simpson, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 09/197,136

(22) Filed: Nov. 20, 1998

Related U.S. Application Data

(60) Provisional application No. 60/066,341, filed on Nov. 21, 1997.

(51) Int. Cl.$^7$ ............................................... G06T 11/20
(52) U.S. Cl. ....................................... 345/440; 345/431
(58) Field of Search ................................ 345/440, 431; 340/990, 995

(56) References Cited

U.S. PATENT DOCUMENTS 5,333,248 A * 7/1994 Christensen
5,355,314 A * 10/1994 Feigenbaum
5,790,123 A * 8/1998 Wald et al. .................. 345/419

OTHER PUBLICATIONS

Keller et al., "Visual Cues: Practical Data Visualization", pp. 97, 1993.*

* cited by examiner

Primary Examiner—Jeffery Brier
Assistant Examiner—Motilewa Good-Johnson
(74) Attorney, Agent, or Firm—Gary L. Bush; Mayor, Day, Caldwell & Keeton, LLP

(57) ABSTRACT

A computer program and a method incorporated therein, called ContourFill, provides several features that enhance the display of contour maps. Even without using color, tick marks and gray-scale shading provide useful and cheaply reproducible representations of contoured surfaces. More dramatic effects are achieved when using color. Occasionally localized peculiarities are observed in the graphical outputs. These are usually traceable to data illegalities such as intersection of contour lines with other lines or penetration of contour lines into blanked areas. The localization of such effects is a tribute to the robustness of the computational algorithms.

12 Claims, 9 Drawing Sheets

(2 of 9 Drawing Sheet(s) Filed in Color)

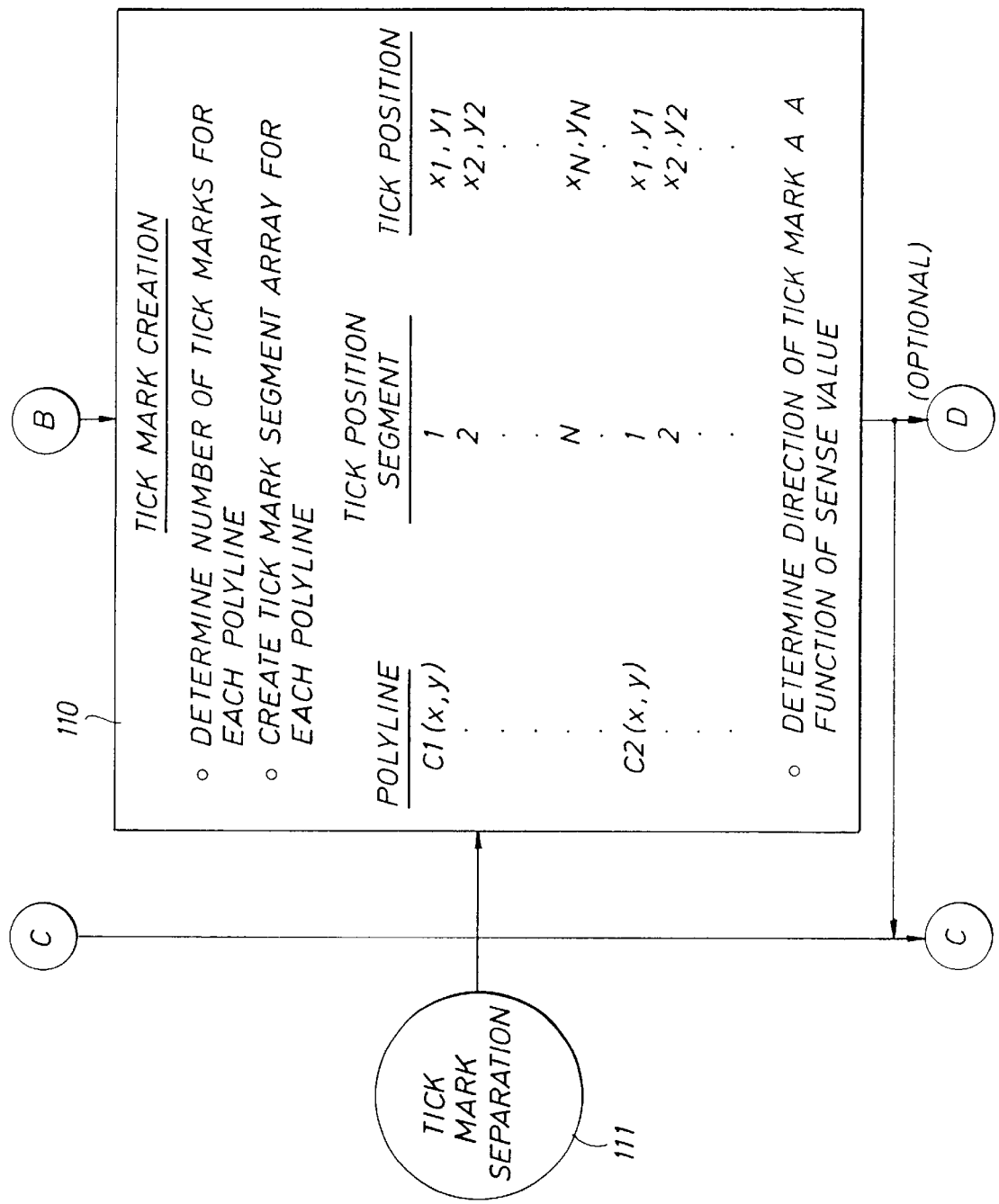

METHOD AND SOFTWARE FOR PRODUCING ENHANCED CONTOUR DISPLAY

REFERENCE TO PREVIOUS PROVISIONAL APPLICATION

This application is based upon and claims priority of U.S. provisional application No. 60/066,341, filed Nov. 21, 1997.

BACKGROUND OF THE INVENTION

1. Field of the Invention

This invention relates generally to the field of methods for displaying contours on maps, especially subterranean contours of geological structures.

2. Description of the Prior Art

Methods for generating contour lines to describe topographical features of surface and subterranean contours have been known in the past, but there has remained a need for quickly yet dramatically enhancing the presentation of such contour maps.

SUMMARY OF THE INVENTION

The invention provides a method, incorporated in a computer program, for filling inter-contour spaces between contour polylines with shading or color and for adding tick marks to contour lines which point to levels of lower depth values or greater reflection times of seismic data.

BRIEF DESCRIPTION OF THE DRAWINGS

The file of this patent contains at least one drawing executed in color. Copies of this patent with color drawing(s) will be provided by the Patent and Trademark Office upon request and payment of necessary fee.

The objects, advantages, and features of the invention will become more apparent by reference to the drawings which are appended hereto and wherein like numerals indicate like parts and wherein an illustrative embodiment of the invention is shown, of which:

FIG. 2B illustrates a contour level analysis where the contour index value is written at the first node; an arrowhead at the second node indicates the ordering of the nodes, and in the enlarged portion of a larger map, the first and second nodes of some of the contours fall outside the graphic window with such values shown in parentheses;

FIG. 2C shows the results of tick mark processing with tick marks made to point to higher z values, where z is the seismic trace reflection time so that ticks point to higher points downhill, which is normal geologic convention;

FIG. 2D illustrates trapezoidal decomposition of contours;

FIG. 2E illustrates gray-scale shading of the trapezoids with tick marks;

DESCRIPTION OF THE INVENTION

Figure 1:
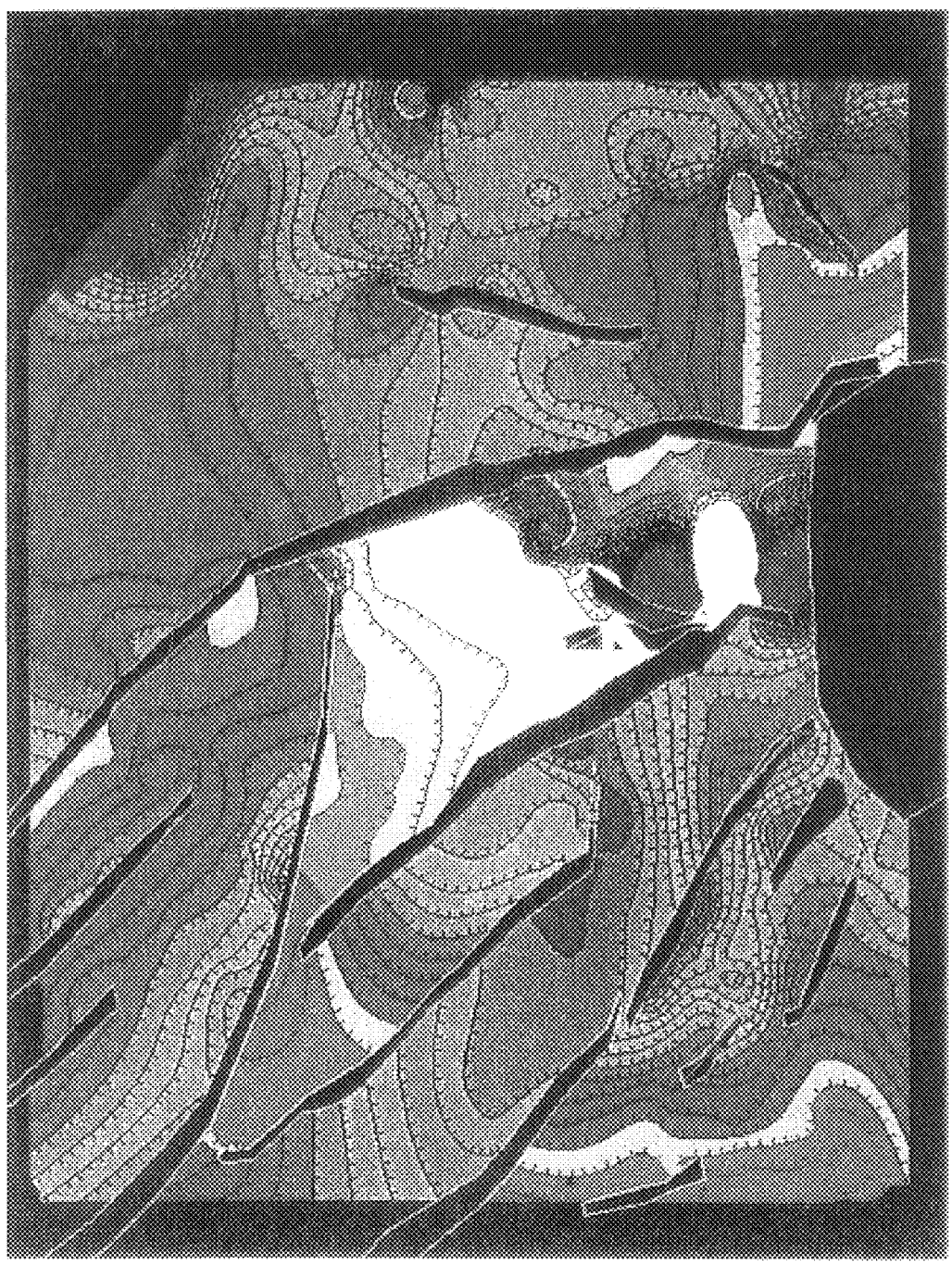
FIG. 1 illustrates the result of the invention for a display of complex contours with numerous fault heaves where tick contours and color fill between contours enhance the display.

The computer program of Appendix A of this specification, called "Contour Fill", incorporates the method of the invention. The program enables the enhancement of contour displays by adding tick marks to contour lines and filling the inter-contour spaces with shading or color as illustrated in FIG. 1.

Figures 1, 2A:
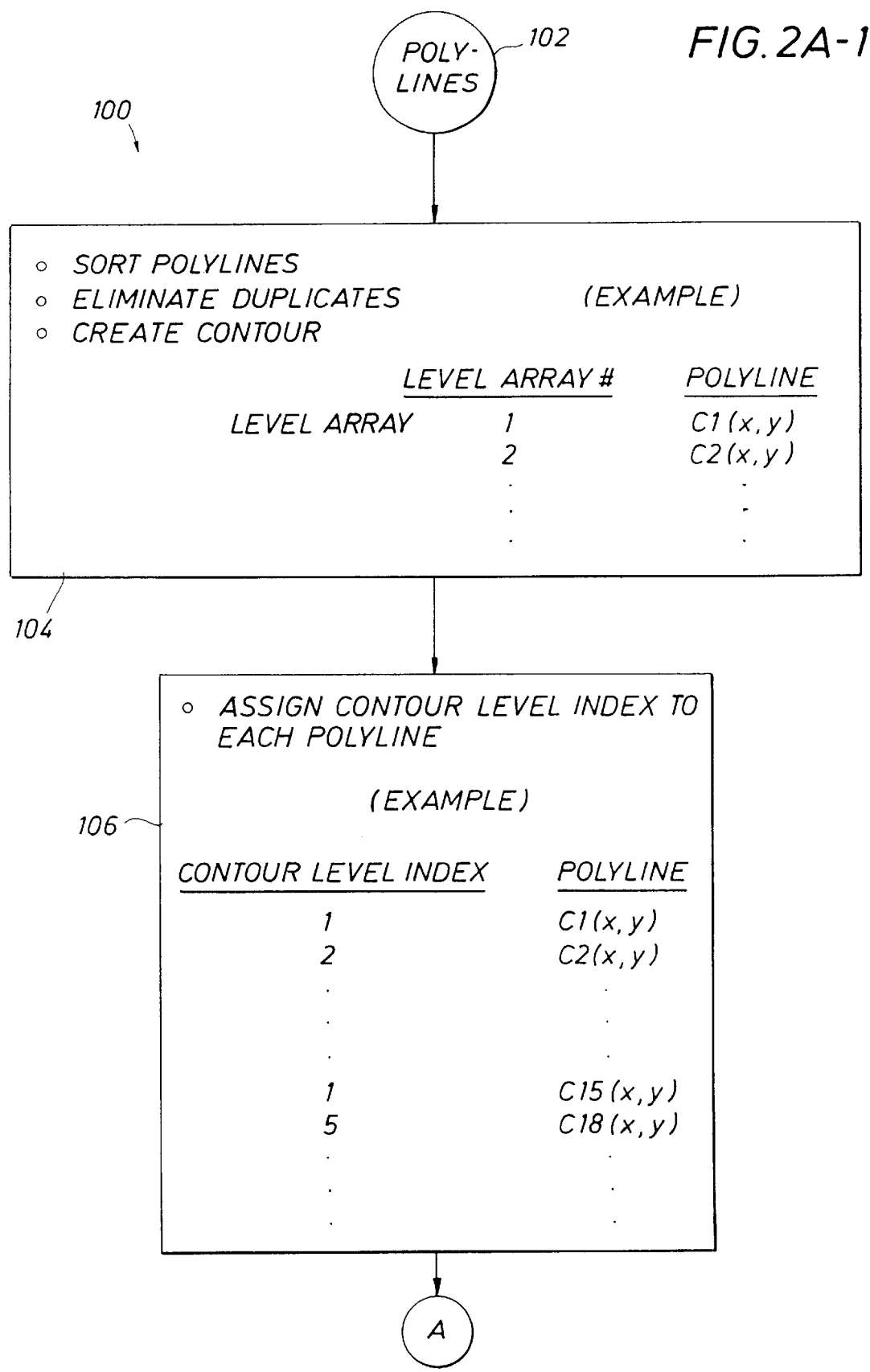
FIG. 2A is a logic flow chart which outlines the logic steps of the method and software of the invention.

FIG. 2A illustrates the logic flow steps of the software 100 which incorporates the method for processing user supplied contour polylines and displaying a map of such polylines with an indicium such as color or shading and optionally with tick marks pointing to lower or to higher levels of adjacent contours.

While the ContourFill program could be used with any program that generates contours, the first application scheduled to use ContourFill is a computer program called Seis Works, from Landmark Graphics Corporation, which generates horizons (among other things) of subterranean formations from seismic data.

The input to ContourFill is a set of contour polylines 102, each with its own contour level, plus an optional set of polygons defining blanked-out areas, e.g., fault heaves, that the contours do not penetrate. The tasks that the ContourFill program 100 performs in processing the contour polylines to generate a map are illustrated in FIG. 2A and described in Appendix A.

The processing tasks include:

assigning to each polyline a contour level index;

determining for each polyline whether surface values immediately to the right of the polyline are higher or lower than its contour level;

generating an array used to add tick marks to the contours; and decomposing the area between contour levels into trapezoids for shading or color fill between contours.

The outputs from ContourFill summarize each processing result in a form that is readily usable by an application's graphics system.

Contour Level Analysis

In a first task as illustrated in logic steps 104 and 106 of FIG. 2A, the program sorts all the given contour levels and then squeezes out duplications. This produces a monotonely increasing array of unique contour levels. Each contour polyline is assigned the appropriate contour level index into that array. The output of the processing is the contour level array and the index assignment array.

Figures 2, 2A:
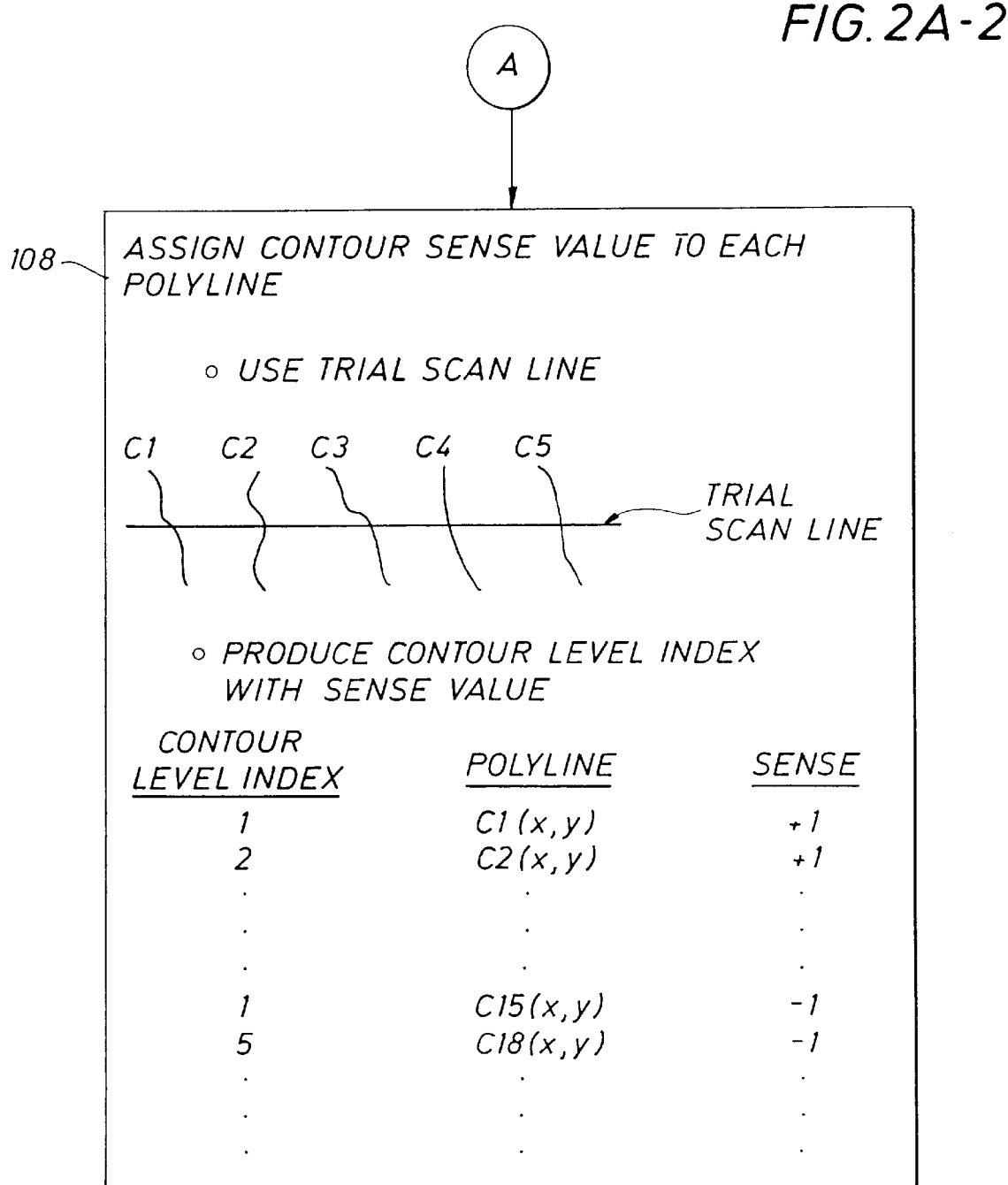
Figures 2, 2A, 3, 4:
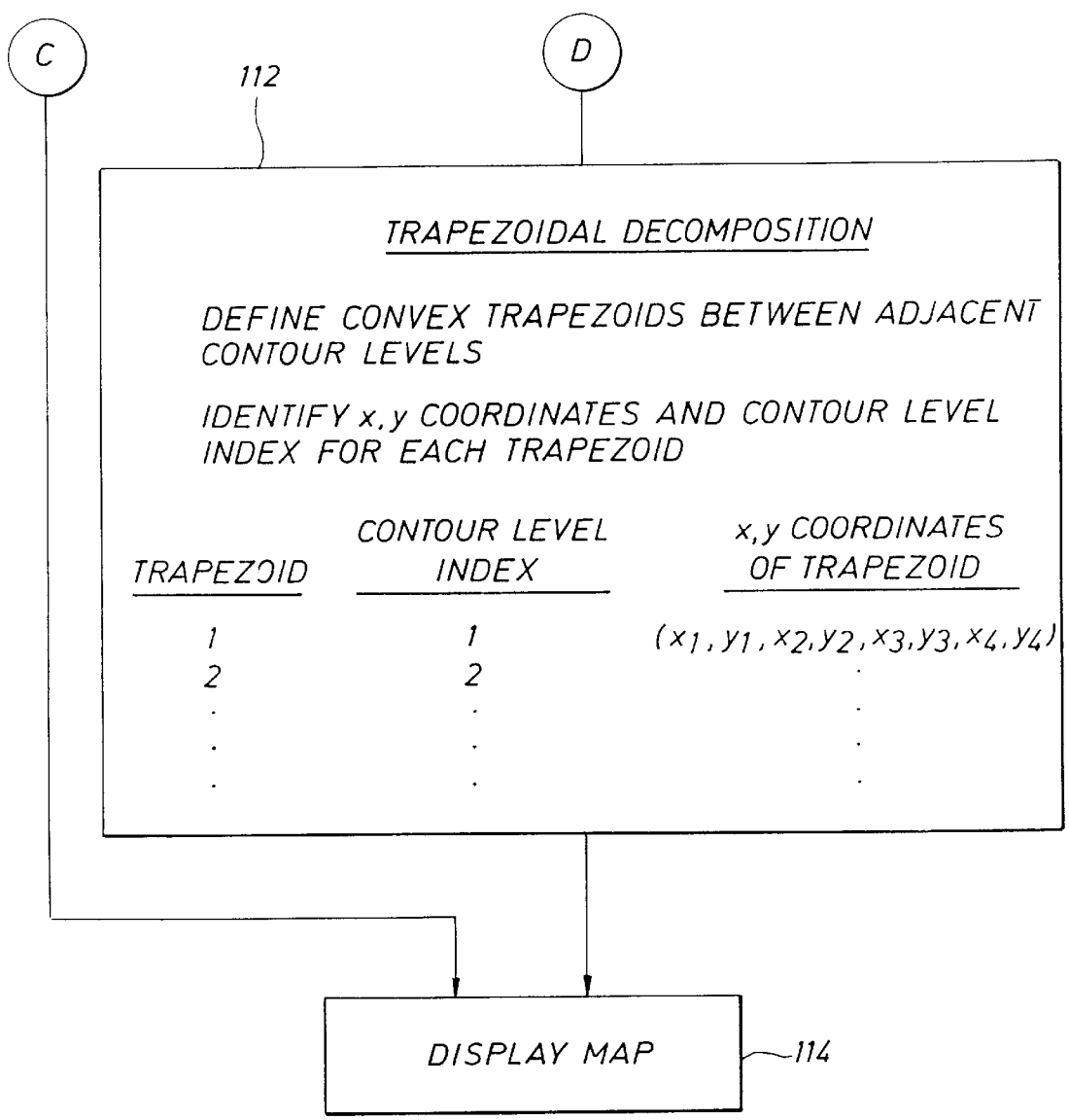
Figure 2B:
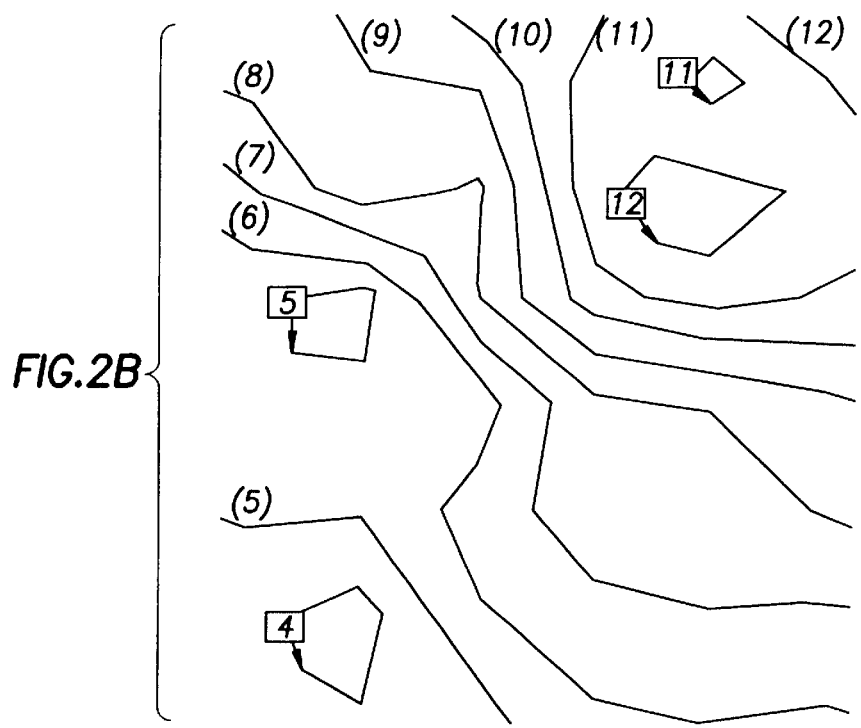
FIGS. 2B–2E illustrate results of the processing by the method of the computer program of the invention, where.

FIG. 2B shows an enlarged detail of a contour map at this stage of the processing. (Notice that FIGS. 2B, 2C, 2D, and 2E are detailed illustrations of the dotted line section of FIG. 3A). The contour level index is written at the first node of each polyline, and an arrowhead written at the second node indicates the ordering of nodes.

Contour Sense Determination

In the second processing task as illustrated in logic step 108 of FIG. 2A, the program assigns a value to each contour polyline that indicates the contour "sense." A value of +1 or −1 tells whether higher contour values lie to the right or to the left as the polyline nodes are traversed in the order given. This is accomplished by a succession of trial scan lines each intersecting a number of contour polylines. Ordering of these intersections indicates which polyline lies next to another polyline of different level. In this way, the "sense" of the polylines can be inferred. The output is the polyline sense array.

Tick-Mark Processing

Figure 2C:
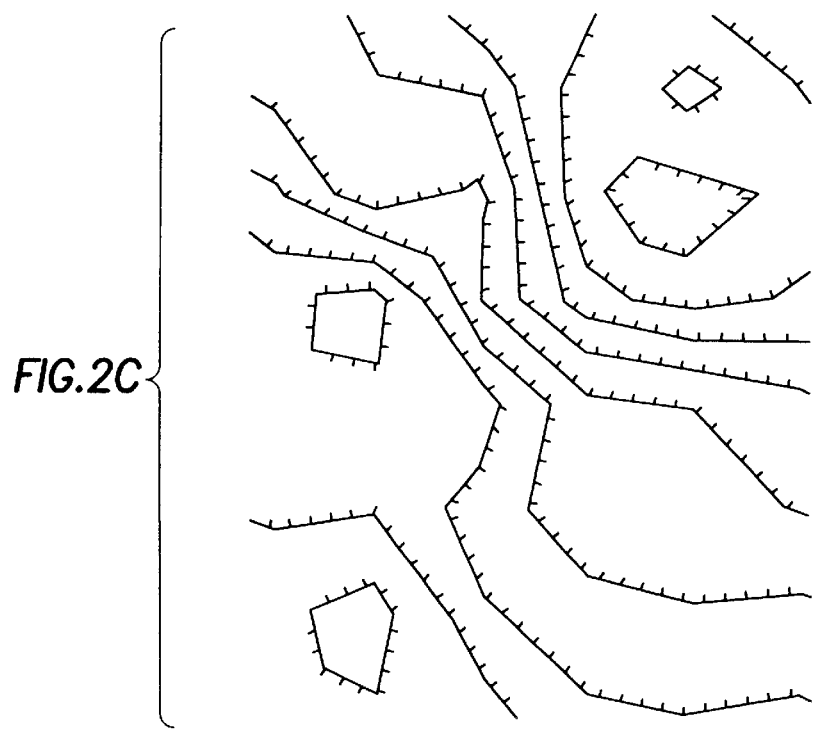

The third processing task, which is optional as illustrated by logic step 110 of FIG. 2A, produces information for the display of tick marks showing contour sense for the contour polylines. Given a user-specified tick mark separation as illustrated by tape 111 of FIG. 2A, the program determines for each polyline how many tick marks will be needed, and produces two arrays, one indicating a segment index within the polyline for each mark, and the other indicating a relative position along the specified segment where the mark is to be placed. The first tick mark is placed half a separation into the beginning of the polyline, and the last tick mark half a separation before the end of the polyline, thereby giving a uniform distribution of tick marks even in cases of closed polylines. This information, plus the sense array from the previous task, enables the program that uses ContourFill to display graphical tick marks always pointing to higher or to lower contour values as desired. (FIG. 2C).

Trapezoidal Decomposition

In the fourth task, which is also optional as illustrated by logic step 112 of FIG. 2A, the program decomposes the areas between successive contour levels into a minimum number of convex quadrilaterals of trapezoidal shape. For each trapezoid the x,y coordinates of the four corners are outputted plus an "interval index" which defines the contour interval for the trapezoid. Such data enables the calling program to produce shading or color-filling of the contour map.

Figure 2D:
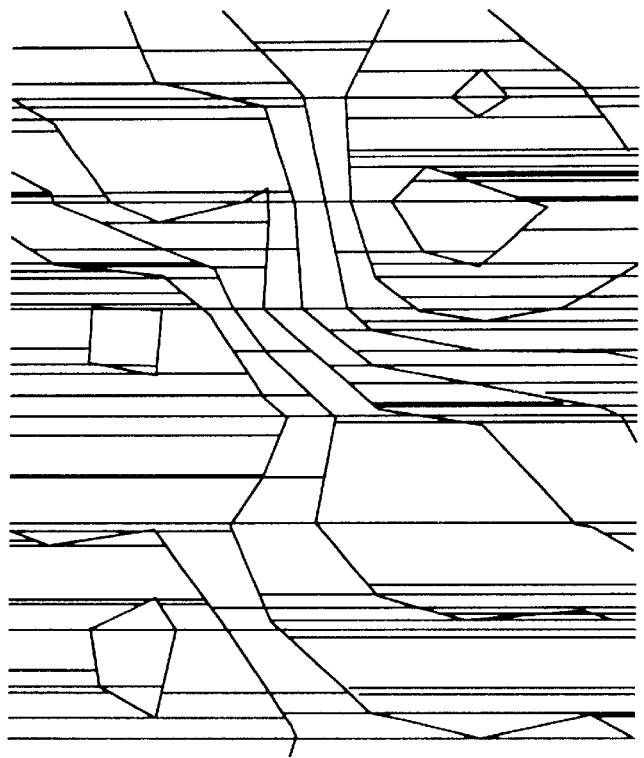
Figure 2E:
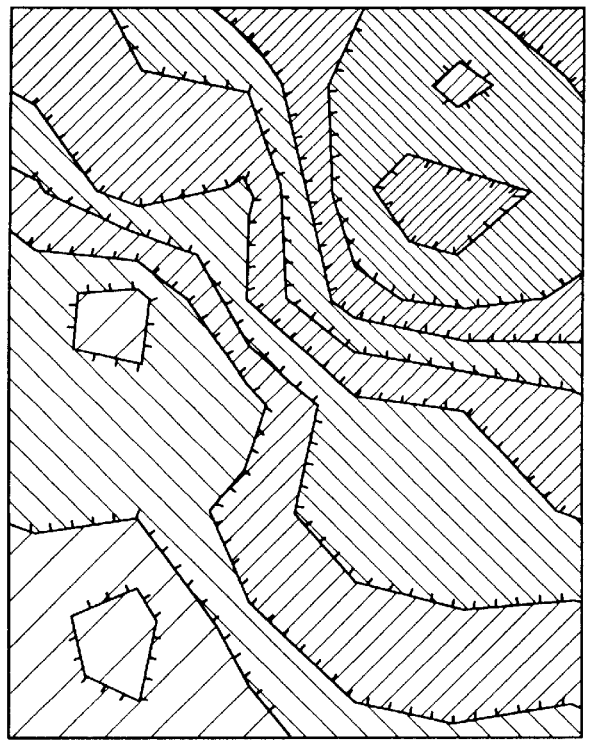

FIG. 2D illustrates this decomposition by outlining the trapezoids which decompose the contour area covered in the preceding figures. Each of the two trapezoid sides lies on a contour polyline or fault polygon, whereas the parallel top and bottom of the trapezoid connect the polylines involved. The decomposition is mainly of academic interest. FIG. 2E shows a gray-scale shading of these trapezoids along with the tick marks of FIG. 2C.

Figure 3A:
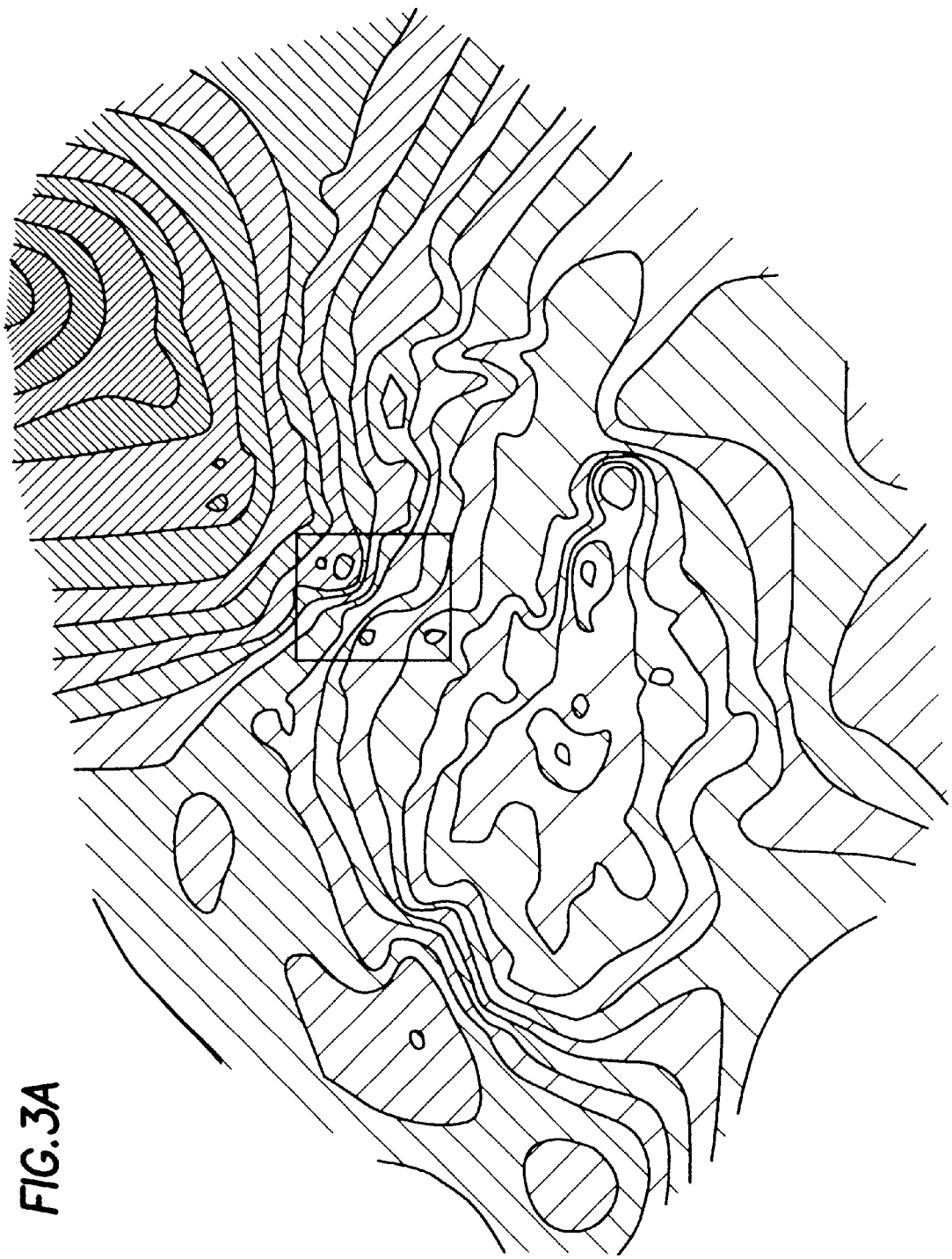
FIG. 3A shows gray-scale shading with tick marks for providing an enhanced contour map that can be reproduced cheaply where dotted lines show the area enlarged in FIGS. 2B–2E.
Figure 3B:
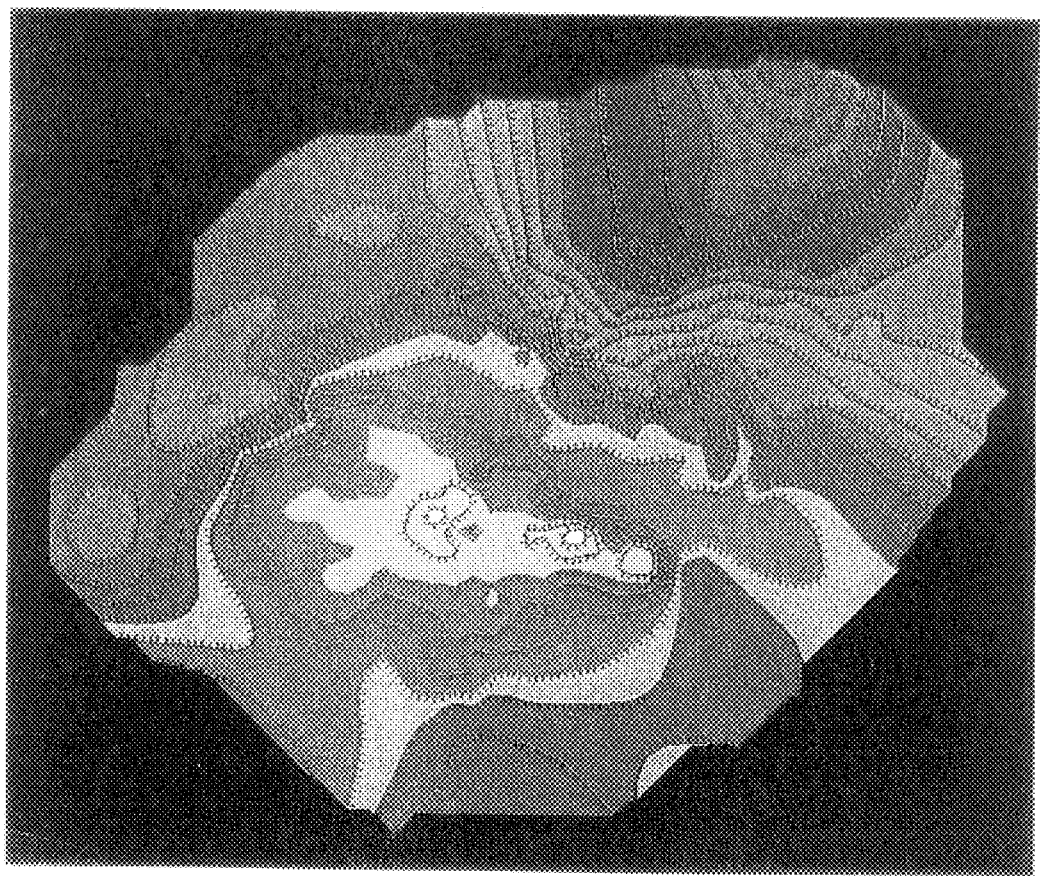
FIG. 3B shows color fill and tick marks which provide an enhanced dramatic display.

FIGS. 3A and 3B show the gray-scale shading and color fill of the entire contour map from which the detail of the FIG. 2 was taken. This figure illustrates that the trapezoidal decomposition is limited by a boundary approximating the convex hull of the contour data but hugging the data somewhat more closely.

The present invention and the best modes of practicing it have been described. It is to be understood that the foregoing descriptions are illustrative only and that other means and techniques can be employed without departing from the full scope of the invention as described in the appended claims.

What is claimed is:

1. A method for generating a map from a set of contour polylines, where each polyline is assigned a contour level, the method comprising the steps of, sorting said polylines into a monotonically changing array of polylines according to each contour level of said polylines to produce a contour level array, assigning a contour level index to each polyline of said polyline array to produce an index assignment array, processing said polylines of said index assignment array to assign a contour sense value to each polyline to produce a polyline sense array, where a contour sense value indicates which polyline lies next to another polyline of a different level, and displaying a distinctive indicium between each polyline of said polyline sense array to create a contour map of said contour polyline.

2. The method of claim 1 further comprising the step of, eliminating duplicate contour polylines so that each polyline of said monotonically changing array of polylines is unique.

3. The method of claim 1 further comprising the steps of, determining the number of tick marks for each polyline as a function of user specified tick mark separation, generating a tick mark segment array for each polyline including a tick position segment and tick position for each polyline as a function of said number of tick marks, determining a direction of tick marks for each polyline as a function of said contour sense value, and displaying tick marks on said polylines according to said position of said tick mark segment array and according to said sense value for each polyline of said polyline sense array.

4. The method of claim 1 further comprising the steps of, decomposing areas between successive contour levels of said contour level array into at least one convex quadrilateral, determining x, y coordinates of corners of each quadrilateral, and displaying an indicium within said quadrilateral coordinates as a function of said contour level index.

5. The method of claim 1 wherein, said indicium is shading between said polylines to indicate a contour level.

6. The method of claim 1 wherein said indicium is a color shade between said polylines to indicate contour level.

7. Software for generating a map from a set of contour polylines, where each polyline is assigned a contour level, comprising, means for sorting said polylines into a monotonically changing array of polylines according to each contour level of said polylines to produce a contour level array, means for assigning a contour level index to each polyline of said polyline array to produce an index assignment array, means for processing said polylines of said index assignment array to assign a contour sense value to each polyline to produce a polyline sense array, where a contour sense value indicates which polyline lies next to another polyline of a different level, and means for displaying a distinctive indicium between each polyline of said polyline sense array to create a contour map of said contour polyline.

8. The software of claim 7 further comprising, means for eliminating duplicate contour polylines so that each polyline of said monotonically changing array of polylines is unique.

9. The software of claim 7 further comprising, means for determining the number of tick marks for each polyline as a function of user specified tick mark separation, means for generating a tick mark segment array for each polyline including a tick position segment and tick position for each polyline as a function of said number of tick marks, means for determining a direction of tick marks for each polyline as a function of said contour sense value, and means for displaying tick marks on said polylines according to said position of said tick mark segment array and according to said sense value for each polyline of said polyline sense array.

10. The software of claim 7 further comprising, means for decomposing areas between successive contour levels of said contour level array into at least one convex quadrilateral, means for determining x, y coordinates of corners of each quadrilateral, and displaying an indicium within said quadrilateral coordinates as a function of said contour level index.

11. The software of claim 7 wherein, said indicium is shading between said polylines to indicate a contour level.

12. The software of claim 7 wherein said indicium is a color shade between said polylines to indicate contour level.

* * * * *